(12) United States Patent
Ittah

(10) Patent No.: US 11,710,174 B2
(45) Date of Patent: *Jul. 25, 2023

(54) PRODUCT DISPLAY GRAPHIC USER INTERFACE

(71) Applicant: Royal App Ltd., Ashdod (IL)

(72) Inventor: Roy Ittah, Ashdod (IL)

( * ) Notice: Subject to any disclaimer, the term of this patent is extended or adjusted under 35 U.S.C. 154(b) by 55 days.

This patent is subject to a terminal disclaimer.

(21) Appl. No.: 17/163,456

(22) Filed: Jan. 31, 2021

(65) Prior Publication Data

US 2021/0217078 A1 Jul. 15, 2021

Related U.S. Application Data

(63) Continuation of application No. 16/073,788, filed as application No. PCT/IB2017/050826 on Feb. 14, 2017, now Pat. No. 10,909,613.

(Continued)

(51) Int. Cl.
*G06Q 30/06* (2023.01)
*G06Q 30/0601* (2023.01)
(Continued)

(52) U.S. Cl.
CPC ......... *G06Q 30/0643* (2013.01); *G06F 3/048* (2013.01); *G06F 3/0482* (2013.01);
(Continued)

(58) Field of Classification Search
CPC ............... G06Q 30/0643; G06Q 30/06; G06Q 30/0601; G06Q 30/0641; G06Q 30/0623;
(Continued)

(56) References Cited

U.S. PATENT DOCUMENTS 6,266,098 B1 7/2001 Cove
7,152,210 B1 12/2006 Walthera et al.
(Continued)

FOREIGN PATENT DOCUMENTS

CN 103970408 A * 8/2014 ........... G06F 3/0412
JP 2013235478 A * 11/2013 ............. G06Q 30/06

OTHER PUBLICATIONS

Article, "rezon8living.com, the Address of Today's Ultimate, On-Line Contemporary Furniture Store; L.A.'s hottest source for contemporary, high fashion furniture, lighting, home accessories and more goes online"; PR Newswire [New York] Jun. 6, 2007, retrieved from Dialog on Aug. 31, 2022 (Year: 2007).*

(Continued)

*Primary Examiner* — Yogesh C Garg
(74) *Attorney, Agent, or Firm* — Dr. Hanan Farber Patent Agent Ltd.

(57) ABSTRACT

A mobile computer system accesses a data base of products. On the display screen of the mobile computer system, a central image of a product is presented in a central position of the display. A first image of another product is presented on the display to a first side of central position of the display. A second image of another product is presented on the display on the second side of central position of the display. The second side of the display is opposite the first side with respect to the central position. Information is acquired with respect to the user and with respect to the product being presented in the central position.

13 Claims, 15 Drawing Sheets

Related U.S. Application Data

(60) Provisional application No. 62/369,772, filed on Aug. 2, 2016, provisional application No. 62/295,078, filed on Feb. 14, 2016.

(51) Int. Cl.
*G06F 3/0482* (2013.01)
*G06F 3/0485* (2022.01)
*G06F 3/048* (2013.01)
*G06F 3/04817* (2022.01)
*G06F 3/04883* (2022.01)

(52) U.S. Cl.
CPC ........ *G06F 3/0485* (2013.01); *G06F 3/04817* (2013.01); *G06F 3/04883* (2013.01); *G06Q 30/06* (2013.01)

(58) Field of Classification Search
CPC .... G06F 3/0487; G06F 3/0482; G06F 3/0485; G06F 3/04883
USPC .......................... 705/27.2, 27.1, 26.63, 26.1
See application file for complete search history.

(56) References Cited

U.S. PATENT DOCUMENTS

| | | | |
|---|---|---|---|
| 7,562,312 | B2 | 7/2009 | Rochford |
| 8,028,250 | B2 | 9/2011 | Vronay |
| 9,223,463 | B1 | 12/2015 | Kawaguchi et al. |
| 9,501,216 | B2 | 11/2016 | Ahn et al. |
| 9,619,926 | B2 | 4/2017 | Ebner |
| RE46,731 | E * | 2/2018 | Woycik ..................... G07F 7/00 |
| 2002/0116348 | A1 | 8/2002 | Philips |
| 2004/0155907 | A1 | 8/2004 | Yamaguchi |
| 2004/0249723 | A1 | 12/2004 | Mayer |
| 2006/0279541 | A1 | 12/2006 | Kim |
| 2008/0243631 | A1 | 10/2008 | Kane et al. |
| 2009/0138823 | A1 | 5/2009 | Bradea |
| 2010/0153831 | A1 * | 6/2010 | Beaton ................... G06Q 30/02 715/201 |
| 2010/0191582 | A1 * | 7/2010 | Dicker ............... G06Q 30/0631 705/26.1 |
| 2010/0205563 | A1 | 8/2010 | Haapsaari |
| 2012/0317513 | A1 * | 12/2012 | Mochizuki .......... G06F 3/04883 715/830 |
| 2013/0080289 | A1 | 3/2013 | Roy et al. |
| 2013/0106690 | A1 | 5/2013 | Lim |
| 2013/0198030 | A1 | 8/2013 | Linden et al. |
| 2015/0012381 | A1 * | 1/2015 | Lazaro ............... G06Q 30/0633 705/26.8 |
| 2015/0019341 | A1 * | 1/2015 | Pasila ................. G06Q 30/0267 705/14.64 |
| 2015/0186950 | A1 * | 7/2015 | Benaiah ............. G06Q 30/0246 705/14.66 |
| 2015/0269645 | A1 | 9/2015 | Gibson et al. |
| 2016/0196035 | A1 * | 7/2016 | Lee ........................ G06F 3/0346 715/810 |
| 2017/0178260 | A1 | 6/2017 | Wilde |
| 2017/0185251 | A1 * | 6/2017 | Jain ..................... G06Q 30/0631 |
| 2017/0186068 | A1 * | 6/2017 | Dumouchel ........ G06Q 30/0643 |

OTHER PUBLICATIONS

International Search Report and the Written Opinion of the International Searching Authority, or the Declaration PCT/IB2016/050505.

Extended search report European Patent Office International application regional phase of PCT/IB2016/050505, EP16746198.7.

Communication pursuant to Art. 94(3) EPC EP17707410.1 Jan. 15, 2021.

\* cited by examiner

PRODUCT DISPLAY GRAPHIC USER INTERFACE

BACKGROUND

1. Technical Field

The present invention relates to a user interface for mobile computer systems and more specifically to a graphic user interface for displaying products.

2. Description of Related Art

Much of our lives are spent communicating with others at home, in the office or on the road with increased reliance of mobile computer systems sometimes known as "smart-phones" or "tablets". Electronic commerce using mobile devices has become commonplace. However, graphic user interfaces for electronic commerce in use for larger screens have not been adapted well to a smaller screen of a smart-phone.

An example of a prior art interface commonly used for electronic commerce using a smart-phone is shown in FIG. 1. As can be seen, the conventional interface is used by selecting through a hierarchy of categories, sub-categories and after many levels of hierarchy the user may finally reach the product or category of interest. In addition, the hierarchy of items is static with logic not always intuitive to the individual user. The process of selecting through the hierarchies may be time consuming. An alternative to selecting through the hierarchies is performing a search with the hope that the keywords used will reduce the number of selections required to reach the desired category or product.

Thus, there is a need for and it would be advantageous to have an improved graphic user interface adapted to the smart-phone display for product selection from a long list of items such as for online shopping.

BRIEF SUMMARY

Various methods, mobile computer systems, display screens and/or graphical user interfaces are disclosed herein. The methods are performable on a mobile computer system provided with a client application. The client application is connectable over a communications network, e.g. wireless with a server application. The client and/or server application accesses a data base of products. On the display screen of the mobile computer system, a central image of a product is presented in a central position of the display. A first image of another product is presented on the display to a first side of central position of the display. A second image of another product is presented on the display on the second side of central position of the display. The second side of the display is opposite the first side with respect to the central position. A product image when presented in the central position is scaled to be significantly larger than a corresponding product image when presented on the first and second sides of the central position. The only product images presented at any instance of time may be the first image, the central image and the second image. The scrolling forward and the scrolling backward may be performed by the user by swiping the display forward and backward respectively. A user may scroll or swipe forward and/or backward to view on the display a previously determined list of products which is a subset of the database of products. The forward scrolling is performed by moving the first image to the central position of the display, moving the central image to the second side and another image of a previous product on the list is presented on the first side of the central position. The backward scrolling is performed by moving the central image to the first side, moving the second image to the central position of the display, and another image of a next product on the list is presented on the second side. Attributes associated with the product presented in the central position of the display may also be presented on the display.

A user may be registered with the server application or otherwise with the system. The user may input a profile including multiple user criteria selected by the user to characterize properties of products according to the user's purchasing preferences. The user may input an identifier of a third-party registered with the server application. The third party having previously input third party criteria which characterize properties of products according to the third party's purchasing preferences. The product attributes presented on the display are responsive to both the user criteria and the third party criteria. The attributes may be presented on the display upon the forward or backward scrolling without any additional action on the part of a user.

Information may be acquired information with respect to the user and the product being presented in the central position. The information may include a total or integrated time that a specific product for sale is presented in the central position of the display and/or number of times a product is presented in the central position. An add-to-shopping-cart icon may be presented on the display to add or increment quantity in the shopping cart of the product being currently presented in the central position. Upon a user of the mobile computer system selecting the add-to-shopping-cart icon a quantity is incremented of items in the shopping cart of the product being currently presented in the central position. A number representing the quantity is superimposed over the image of the product being currently presented in the central position. During the forward and the backward scrolling the superimposition of the number representation is maintained of the quantity of items in the shopping cart of the product.

Similarly, a decrement-shopping cart icon, e.g. minus sign, may be presented on the display to decrease the quantity or remove a product in the shopping cart of the product currently presented in the central position.

Various non-transitory computer-readable-media are disclosed herein having software instructions stored therein to perform various methods as disclosed herein.

BRIEF DESCRIPTION OF THE DRAWINGS

The invention is herein described, by way of example only, with reference to the accompanying drawings, wherein.

Figure 1:
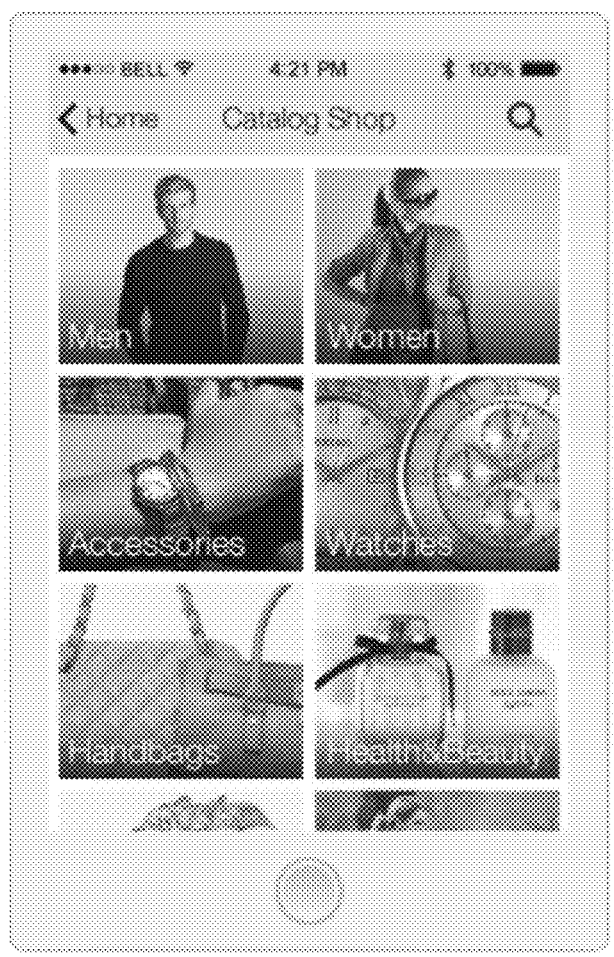
FIG. 1 shows a screen shot of a conventional graphic user interface for electronic commerce using a smart-phone.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

By way of introduction, various embodiments of the present invention are directed to an innovative graphic user interface which is useful for electronic commerce, particularly on a small screen of a smart-phone. The graphic user interface, according to features of the present invention, may be less hierarchical than prior art graphic user interfaces and is directed to avoid having the user select through several branched lists of products in order to reach a product of interest. The underlying list of products presented to the user, according to features of the present invention, may be "flat", "unbranched" and not hierarchical.

Figure 2:
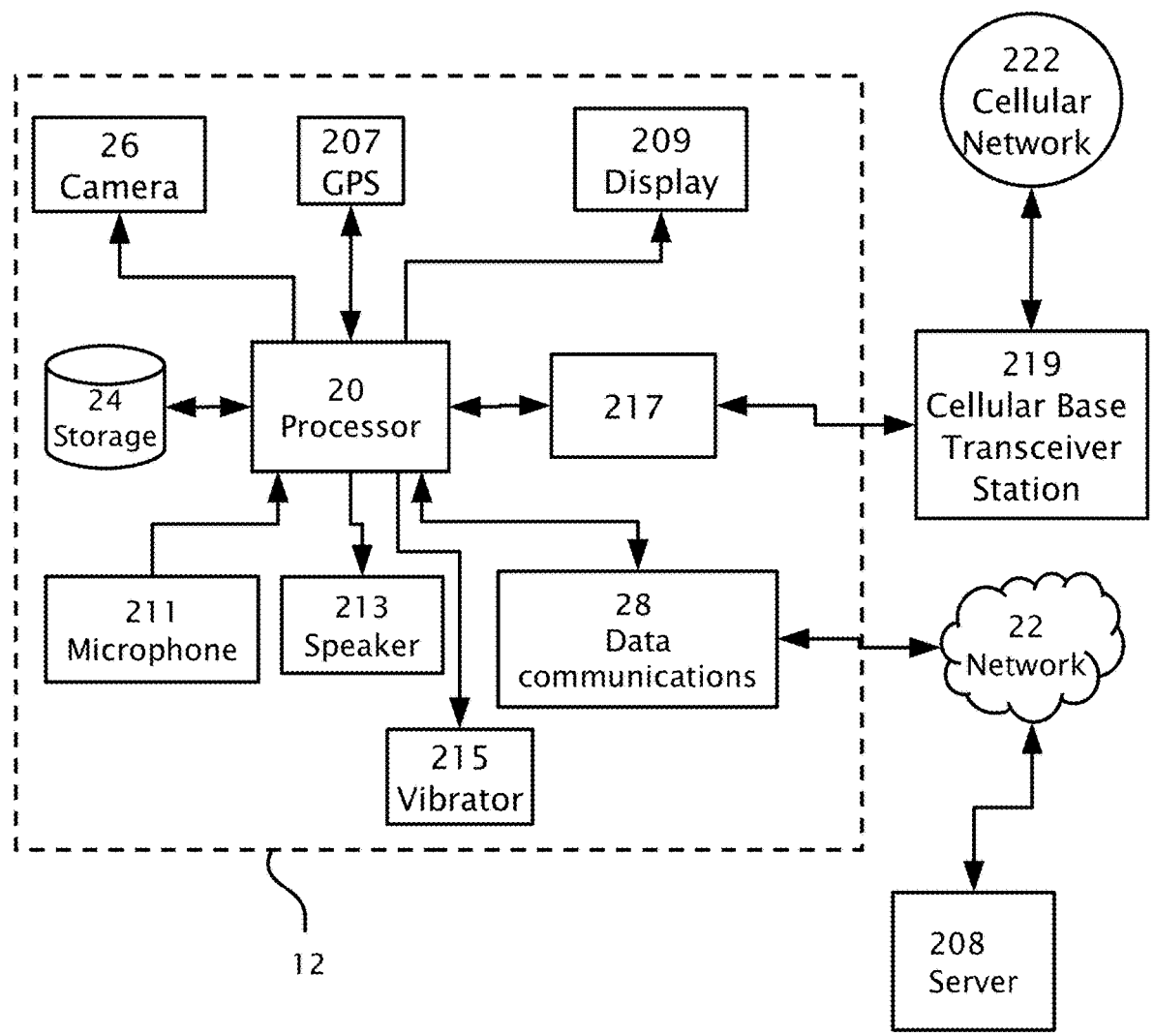
FIG. 2 illustrates a simplified block diagram of a mobile computer system with network connections, according to features of the present invention.

Referring now to the drawings, reference is now made to FIG. 2 which illustrates a simplified block diagram of mobile computer system 12 according to features of the present invention. Mobile computer system 12 is connectable over a data network 22 to a server 208. Mobile computer system 12 is also connectable through a cellular base station transceiver 219 to the remainder of cellular network 222. Mobile computer system 12 includes a processor 20 connected to local data storage 24. A data communications module 28 connects processor 20 to data network 22. A cellular communications module 217 connects processor 20 to cellular network 222. Mobile computer system 12 may include connected to processor 20, peripheral accessory devices such as a display 209, global positioning system (GPS) 207, camera 26, a microphone 211, a speaker 213, a vibrator 215, accelerometer/gravity sensor, gyroscopic sensor, Blue-tooth™, infra-red sensor (not shown). Mobile computer system 12 may be for example an iPhone™ of Apple Inc., or a smart-phone configured to run an Android™ open operating system or a tablet such as iPad™ or a tablet running on an Android™ operating system.

Figure 3A:
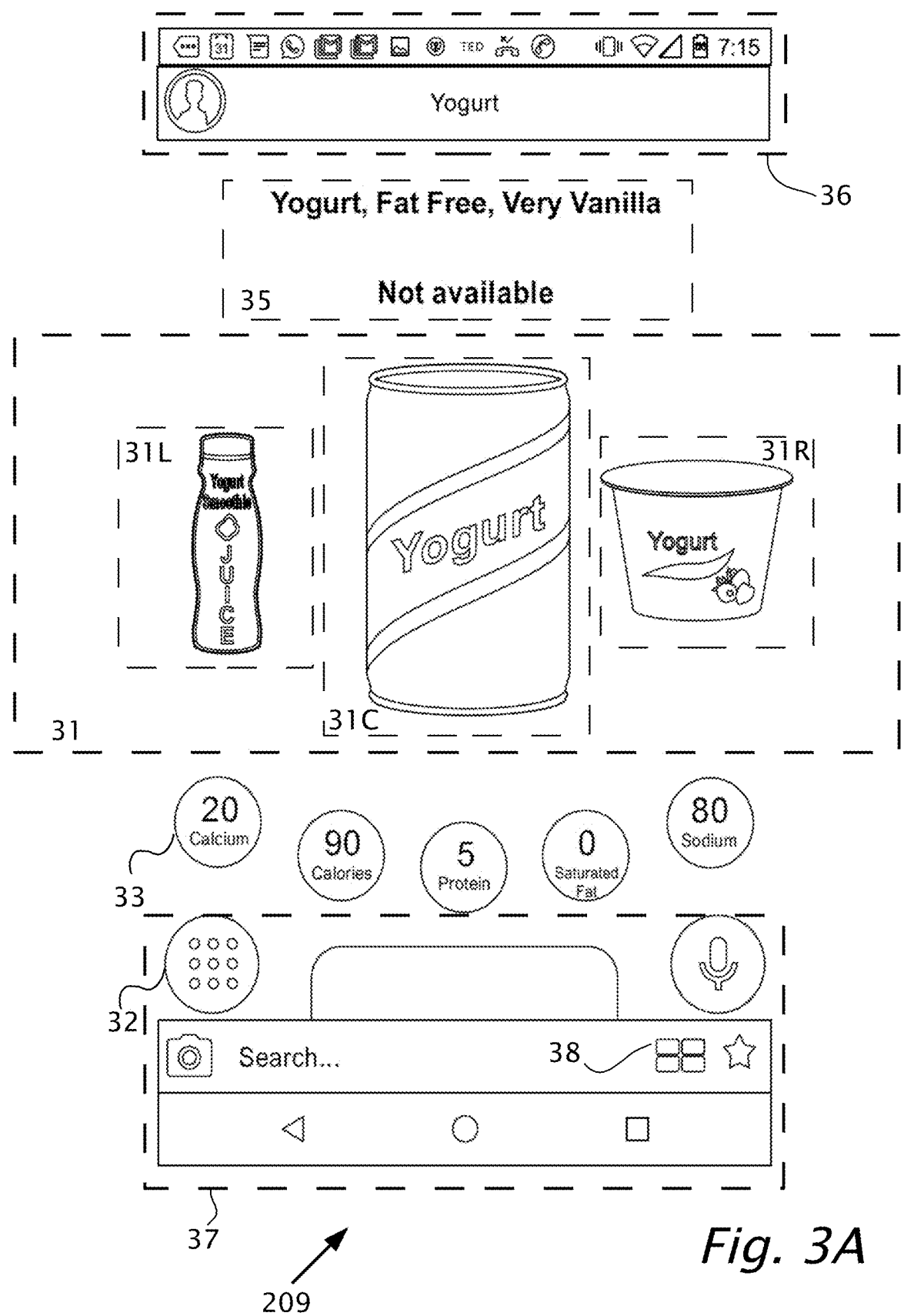
FIGS. 3A-3C illustrates scrolling of product images in display screens while scrolling through a list of products.

Reference is now made to FIG. 3A which illustrates a line drawing of a display screen 209 of a smart-phone or tablet 12, illustrating a graphic user interface according to features of the present invention. In the central portion 31 of display 209, three regions 31L, 31C and 31R are shown. Region 31L is shown to the left side of region 31C and region 31R is shown to the right side of region 31C, by way of example. Within center region 31C of display 209 is an image, e.g. high resolution color image, of a specific yogurt product by way of example. The image of the product featured in center region 31C may be scaled larger, e.g. at least 7/6 times larger than the product images when they appear on the sides in regions 31L and 31R. Alternatively, or in addition, the image presented in the central position 31C at each instant in time, is an image of a single product with a distinctive characteristic, (e.g. color versus gray scale, reduced resolution, spatially or colored filtered) different from the images presented on the first and second sides of the central position 31C. In an alternative equivalent embodiment of the present invention, the three regions 31L, 31C, 31R may be arranged vertically instead of horizontally. The term "carousel" as used herein refers to region 31 and/or collectively regions 31L, 31C and 31R or display 209. The term "carousel" is used because as the images move around on display 209 they may appear like a carousel. Specifically, while scrolling the product image in center region 31C toward either of the side regions 31L and 31R, the dimensions of the image may be scaled down proportional to the distance from a vertical line bisecting central region 31C. While scrolling the product image to the center region 31C from either of the side regions 31L and 31R, the dimensions of the image may be scaled up inversely proportional to the distance from a vertical line bisecting central region 31C.

Information 35, e.g. name of product, availability of product, may appear above the yogurt product featured in central region 31C. Below, the image of the yogurt product featured in central region 31C, may appear attributes 33 (only one of five exemplary attributes is referenced) of the specific yogurt product shown in center region 31C. Attributes 33 shown by way of example are in a serving: amount of calcium, number of calories, amounts of protein, saturated fat, and sodium (units of each are known or implicit). Information 35 and attributes 33 may be symmetrically presented about a vertical bisecting lines of region 31 and/or region 31C.

Selecting the product imaged in the central position may open further information in a new window below region 31. Deselecting the product imaged in the central position closes the new window with the further information.

A section 36 at the top of display 209 may include a name of a user of smart-phone 12, user profile icon, a brief description of the current item displayed in center region 31C, current date, battery level, "Wifi" availability, "Wifi" strength, call icon, SMS, and e-mail icons and/or other icons.

Section 37 shown below attributes 33, may provide the user use of microphone 211 of smart-phone 12 and camera 26 of smart-phone 12. A search area where a user may search for a particular product, a 'favorite' star icon to allow a product displayed in center region 31C to be 'favourited' by the user and a category menu selector icon 38.

A software button 32 shown in section 37 which when selected opens a new window (not shown) which shows multiple icons each of which represents a "shelf" holding multiple products. The icons may appear in the new window as horizontal shelves. Scrolling up and down through the horizontal shelves is available preferably in multiple scrolling speeds and with a label identifying the type of products being displayed. The label may be stationary in the window, or the label may move up and down vertically together with the screen motion of the scrolling. Thus, the user may select software button 32, scroll through and select one of the multiple icons to load a "shelf" of product images for display which represents a subset of the database of products. In the carousel, the shelf may be circularly connected so that on passing the end of the shelf, the product at the beginning of the same shelf is displayed. Alternatively, adjacent shelves may be connected so that on reaching the end of a shelf the beginning of the next shelf is displayed in the carousel, or the shelves may be disconnected so that on reaching the end of the shelf the carousel "stops" turning and further forward or backward scrolling is unavailable because a terminal product image has been displayed. The order of the products when loaded into the carousel may be based on stored information such as user personalization, historical shopping carts and/or third-party preferences.

Figure 3B:
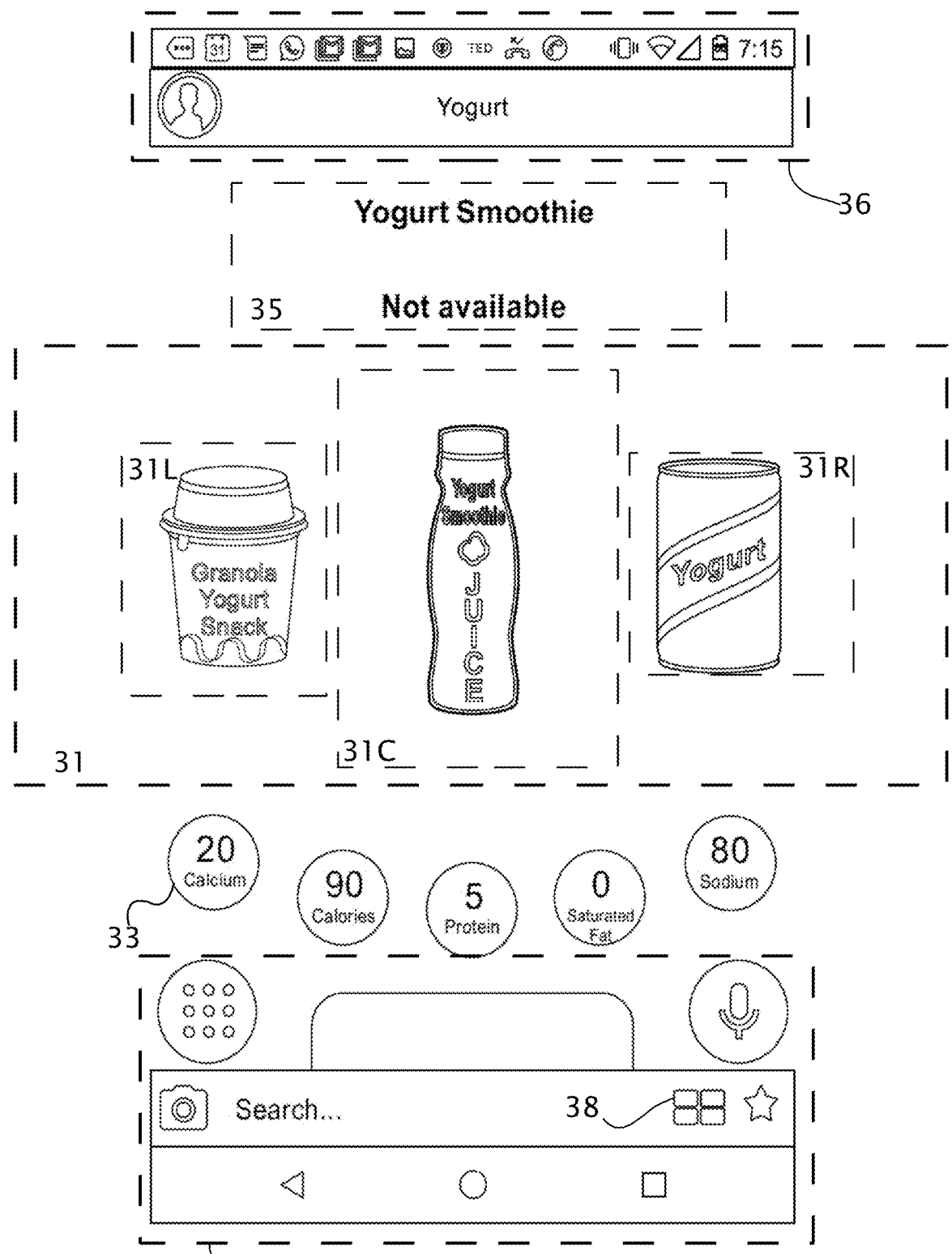

Reference now made to FIG. 3B which shows by way of example a result of region 31 of display 209 shown in FIG. 3A being swiped laterally from left to right in region 31 by the user, according to a feature of the present invention. The result shows the specific yogurt previously shown in region 31C now appears in region 31R and the juice bottle previously in region 31L now appears in region 31C and a Granola yogurt product in region 31L. The image featured in center region 31C is scaled significantly larger, e.g. at least 7/6 times the scale of the images when shown in side regions 31R and 31L.

Figure 3C:
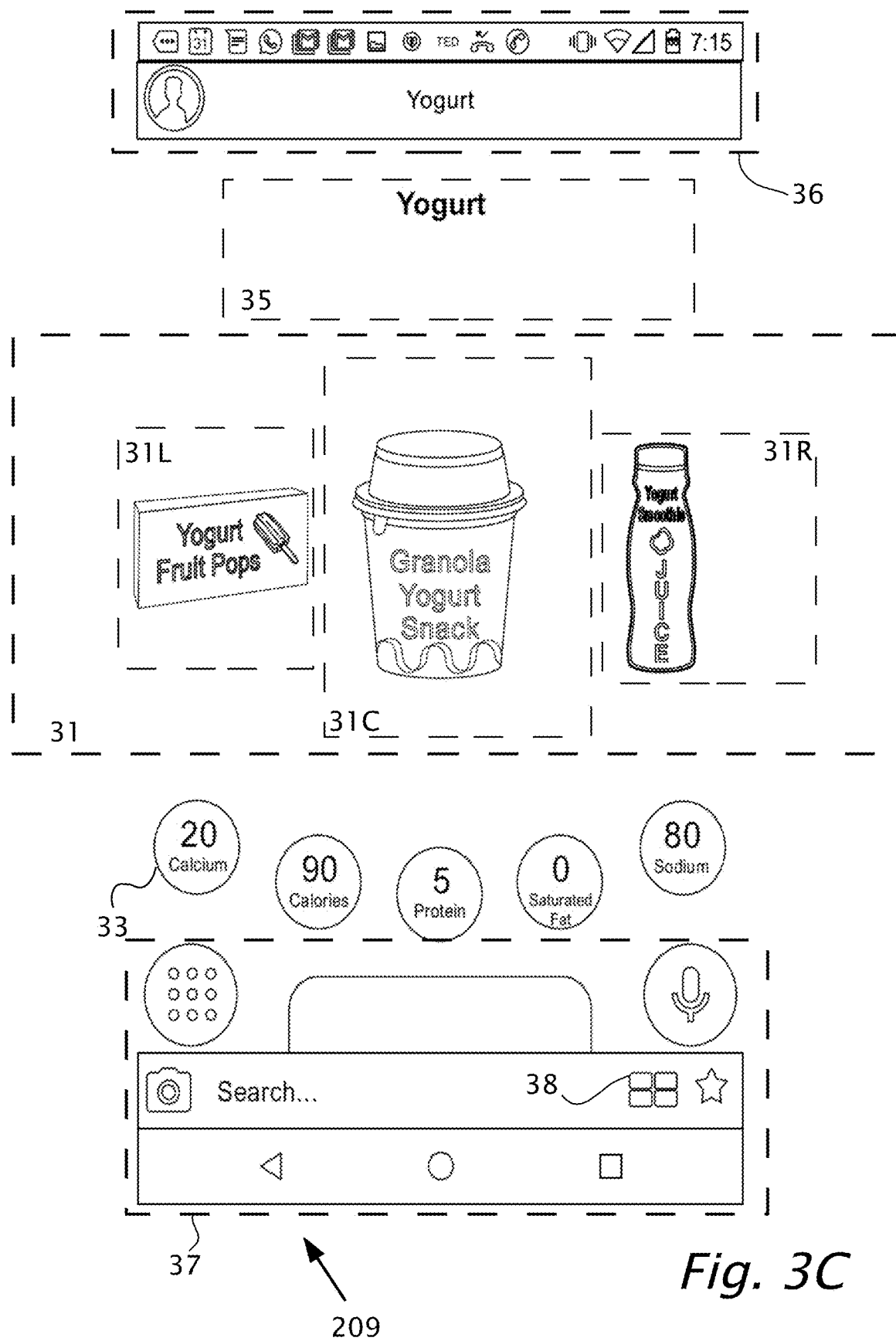

Reference now made to FIG. 3C which shows a result of region 31 of display 209 shown in FIG. 3B being swiped again laterally from left to right by the user, according to a feature of the present invention. The result shows the juice bottle previously shown in central region 31C now appears in region 31R and the Granola yogurt previously in region 31L now appears in region 31C and a fruit pop product now appears in region 31L.

The user may continue to swipe from left to right in region 31 or may wish to swipe from right to left in region 31 so that a product previously shown in region 31C now appears in region 31L, a product image formerly presented in region 31L now appears in region 31C and an image of a new product now appears in region 31R. Each time the user swipes central portion 31 of display 209 attributes 33 for the product displayed in region 31C are updated and displayed to the user. Each time the user swipes central portion 31 of display 209, attributes 33 for the product displayed in region 31C are updated and displayed to the user without requiring any further action by the user to view the product information.

Figure 4A:
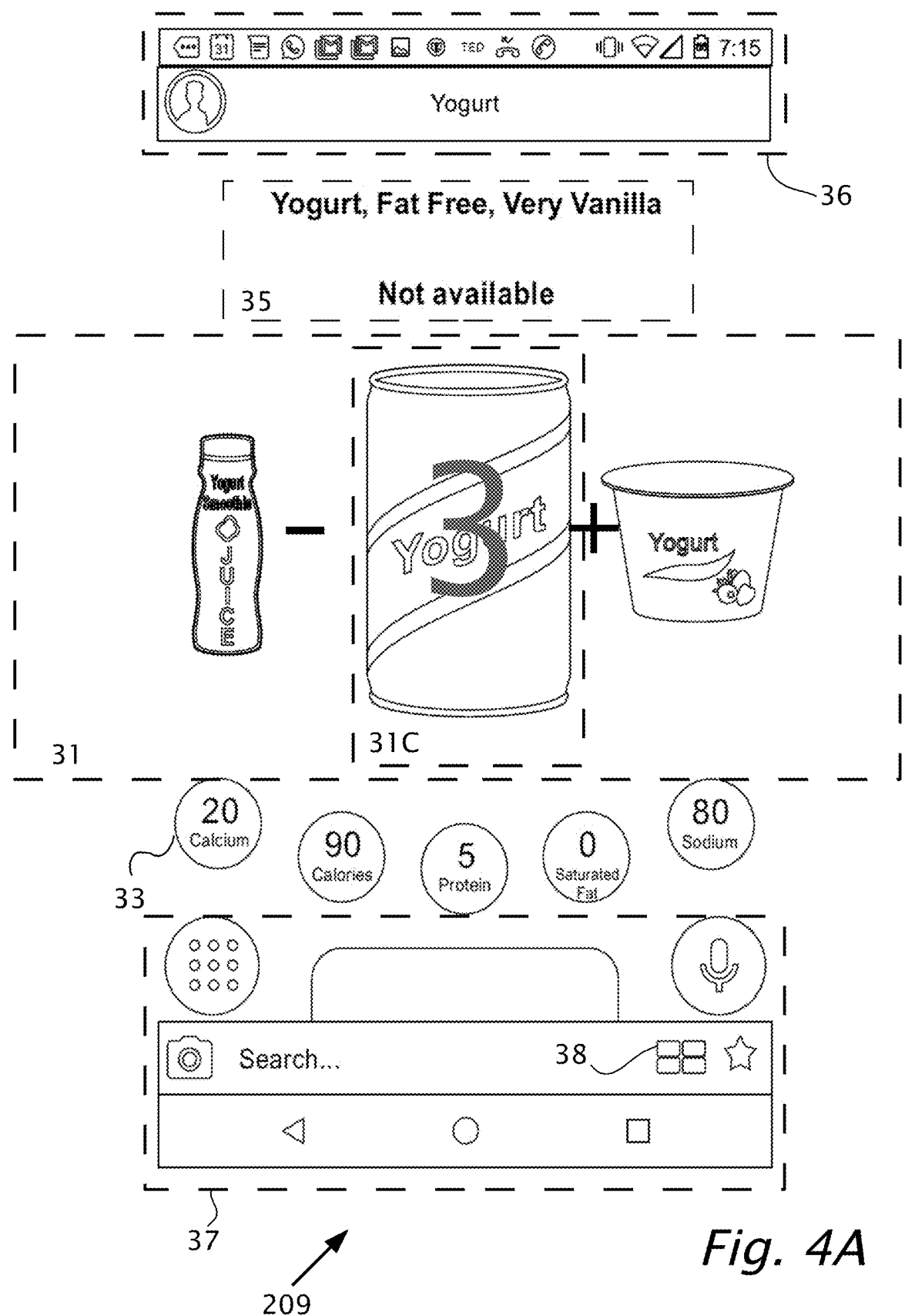
FIGS. 4A and 4B, illustrates a display, according to features of the present invention.

Reference is now made to FIG. 4A, which shows an image in central region 31 of display 209, according to a feature of the present invention. A plus icon (+) is shown to the right of the product featured in region 31C and a minus icon (−) is shown to the left of the product in region 31C. If the user wishes to add to the shopping cart more of the product displayed in region 31C, the user presses the plus icon (+). The image in center region includes the number "3" superimposed over a product displayed in region 31C. The number "3" indicates that three items of the product have been placed in the shopping cart by the user.

Similarly if the user wishes to remove the product displayed in region 31C from the shopping cart, or decrement the quantity, the user presses the minus icon (−) and the number which appears superimposed on the product image is shown as decremented.

Figure 4B:
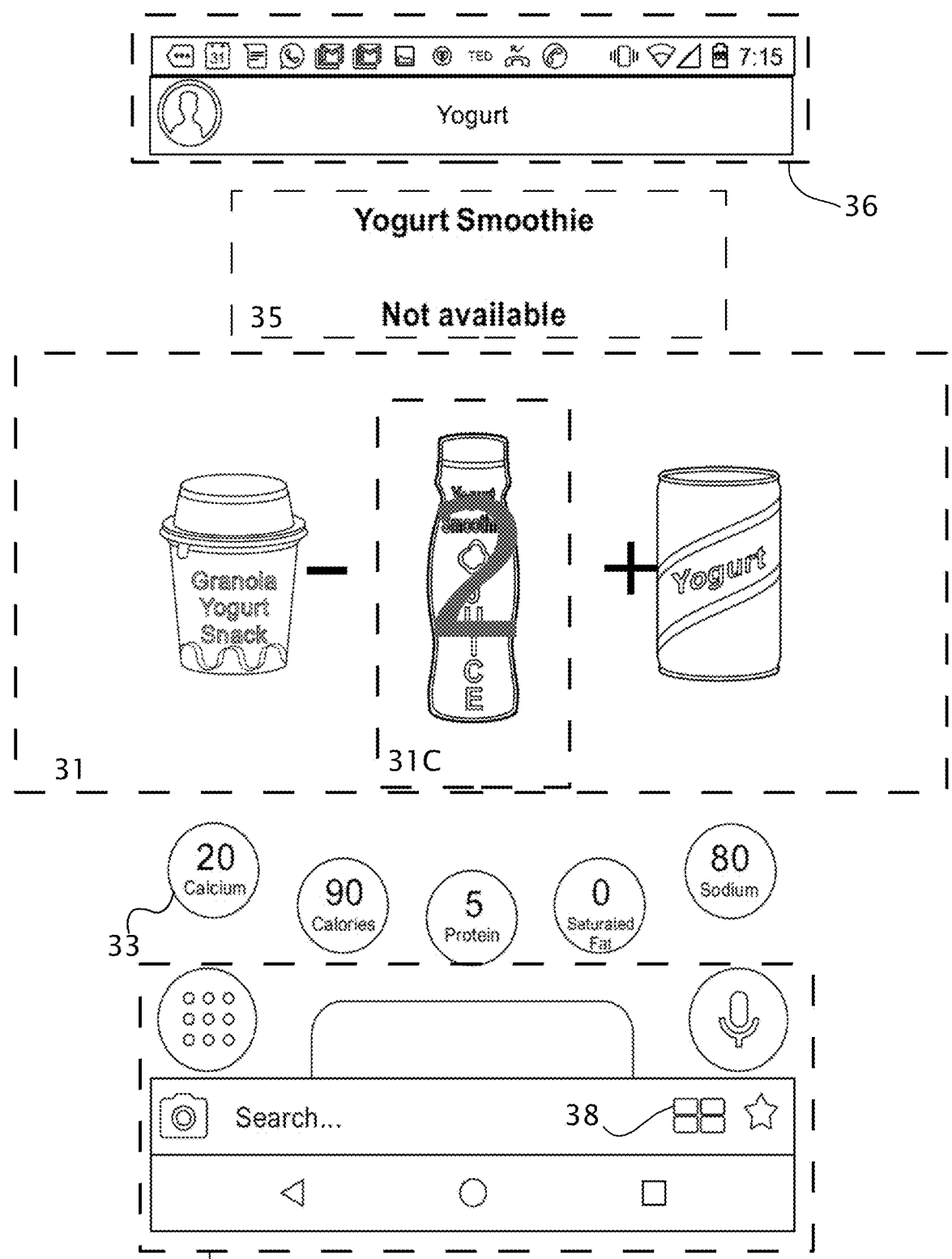

Reference is now made to FIG. 4B, which shows a superimposed image in the central region of display 209 as a result of a user swiping display 209 from left to right, according to a feature of the present invention. The result shows the juice bottle being displayed in region 31C and the number "2" superimposed over the juice bottle which indicates that two of the juice bottle is in the shopping cart. As described previously the user may add or subtract from the shopping cart by use of the plus (+) and minus (−) icons respectively. The number of items in the shopping cart may remain superimposed on the respective images as they are being swiped from region to region on display 209.

Figure 5A:
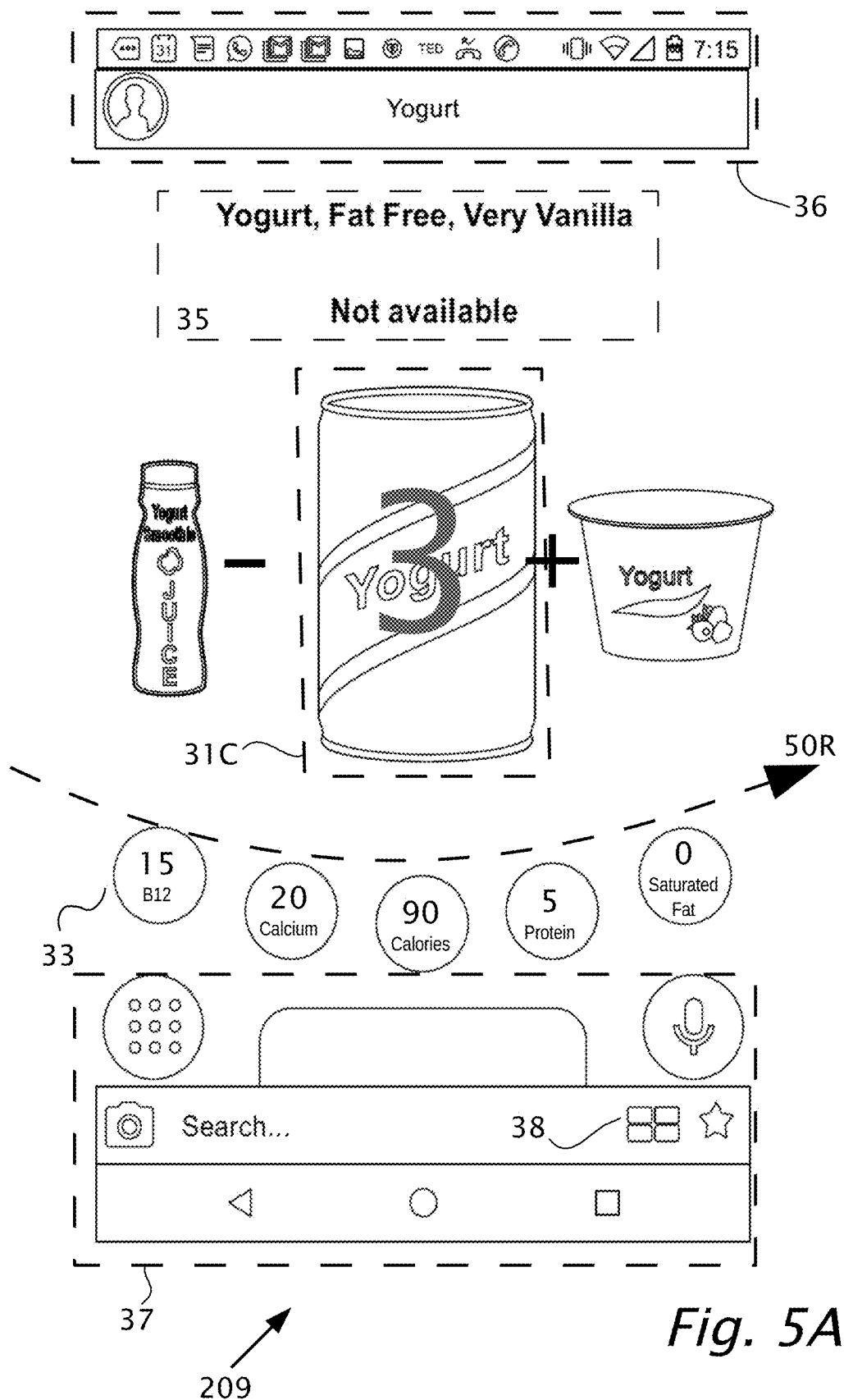
FIGS. 5A and 5B illustrates a display with features according to the present invention.
Figure 5B:
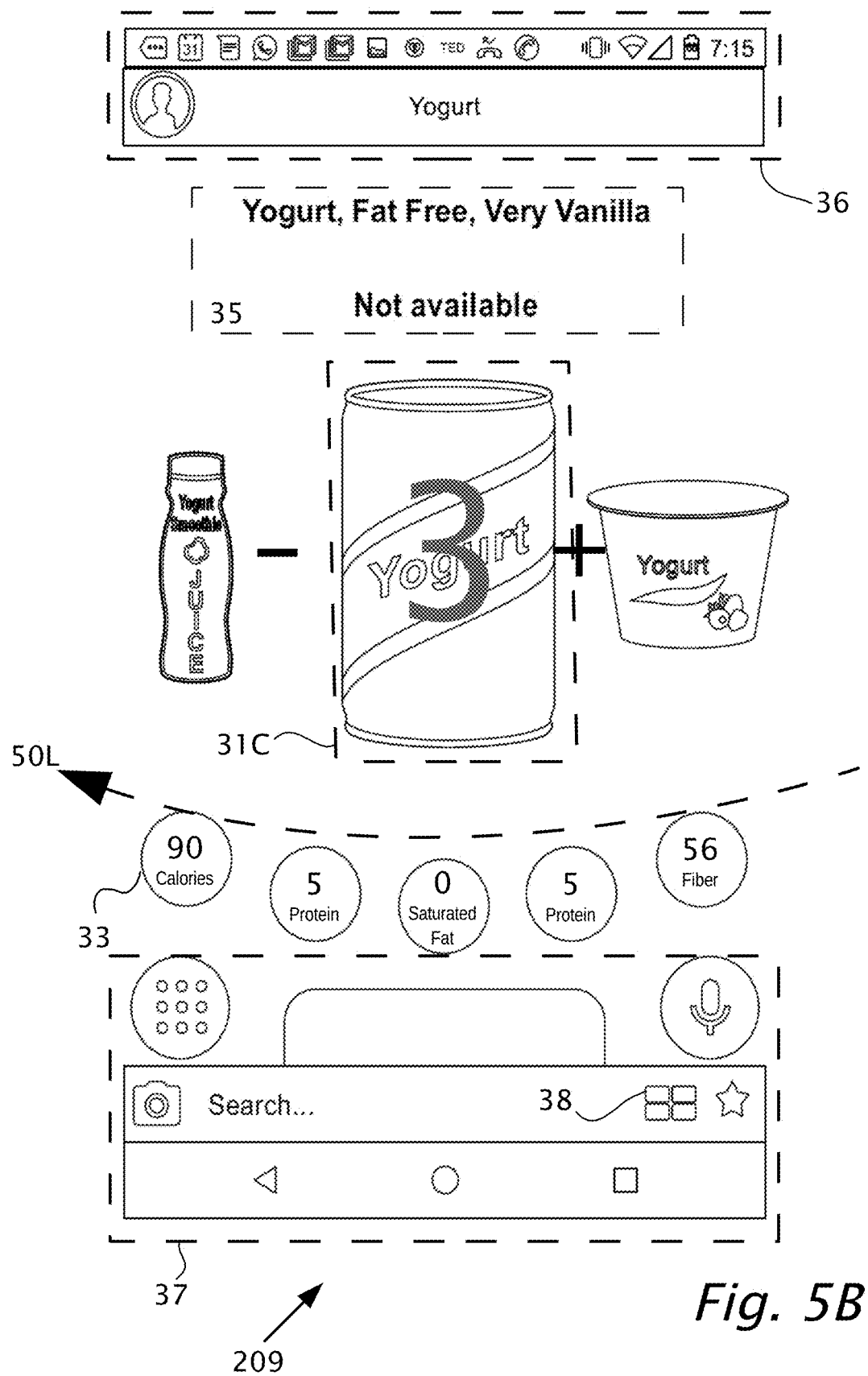

Reference is now made to FIGS. 5A and 5B which shows a feature where a user is able to reveal more attributes 33 for a product displayed centrally on display 209. In FIG. 5A, the user may swipe an arc indicated by dotted arrow 50R, and attributes are moved to the right so that in reference to FIG. 4A, the right most attribute 33 changes form "Sodium" to "Saturated Fat" and a new attribute 33 for example "B12" may be introduced on the left side. Further swiping of the arc indicated by dotted arrow 50R may introduce further new attributes 33 over onto the left hand side. Similarly in FIG. 5B, when the user swipes in an arc indicated by dotted arrow 50L, attributes 33 are moved to the left so that in reference to FIG. 4A the left most attribute 33 may change from "Calcium" to "Calories" and a new attribute 33 of "Fiber" is introduced over onto the right hand side. Further swiping of the arc indicated by dotted arrow 50L may introduce further new attributes 33 on the right side.

Figure 6A:
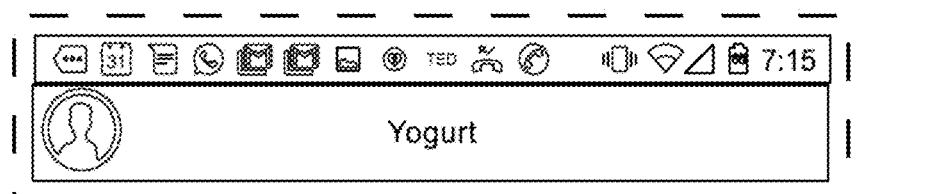
FIG. 6A illustrates further features, according to a feature of the present invention.
Figure 6A:
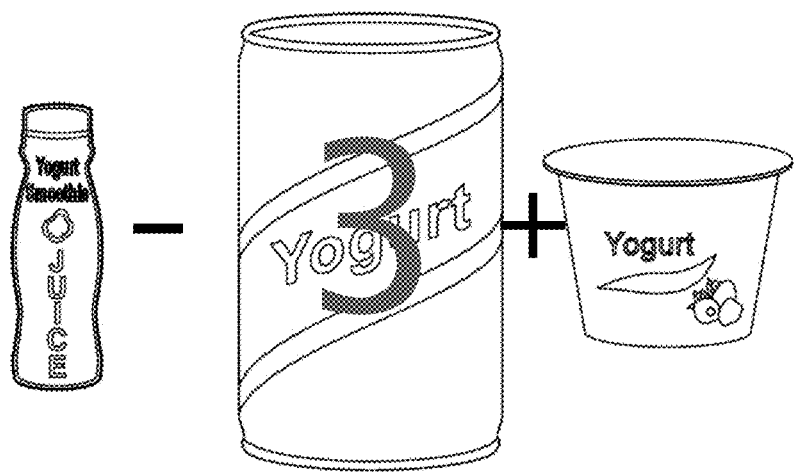
Figure 6A:
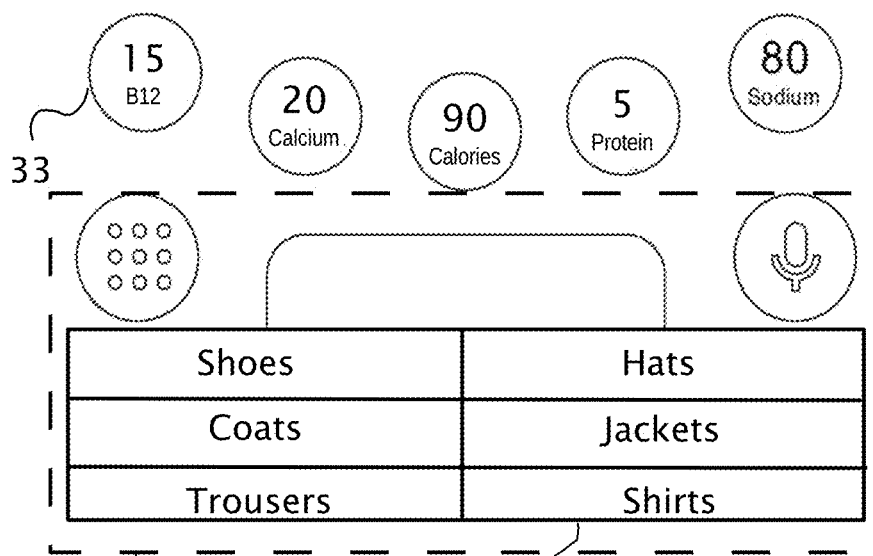

Reference is now also made to FIG. 6A which shows further details of section 37, according to a feature of the present invention. FIG. 6A is as a result of the user pressing a category menu selector icon 38 shown in FIG. 3A. Displayed items in regions 31L, 31C and 31R remain the same as a result of the user pressing category menu selector icon 38. Selectable category items such as shoes, hats, coats, jackets, trousers and shirts are shown in region 60. The category item icons in region 60 may be scrolled left or right and/or up and down to reveal other category item icons by sweeping region 60 left or right and/or up and down. Pressing a category item icon may load new product items for display in the "carousel" in regions 31L, 31C and 31R and the list of products which feeds the "carousel" when swiped is updated. When the list of items feeding the carousel is updated, the categories shown in section 37 may revert to the background. Alternatively, the list of products may be updated based on user personalization, historical shopping carts and/or third-party preferences.

Figure 7:
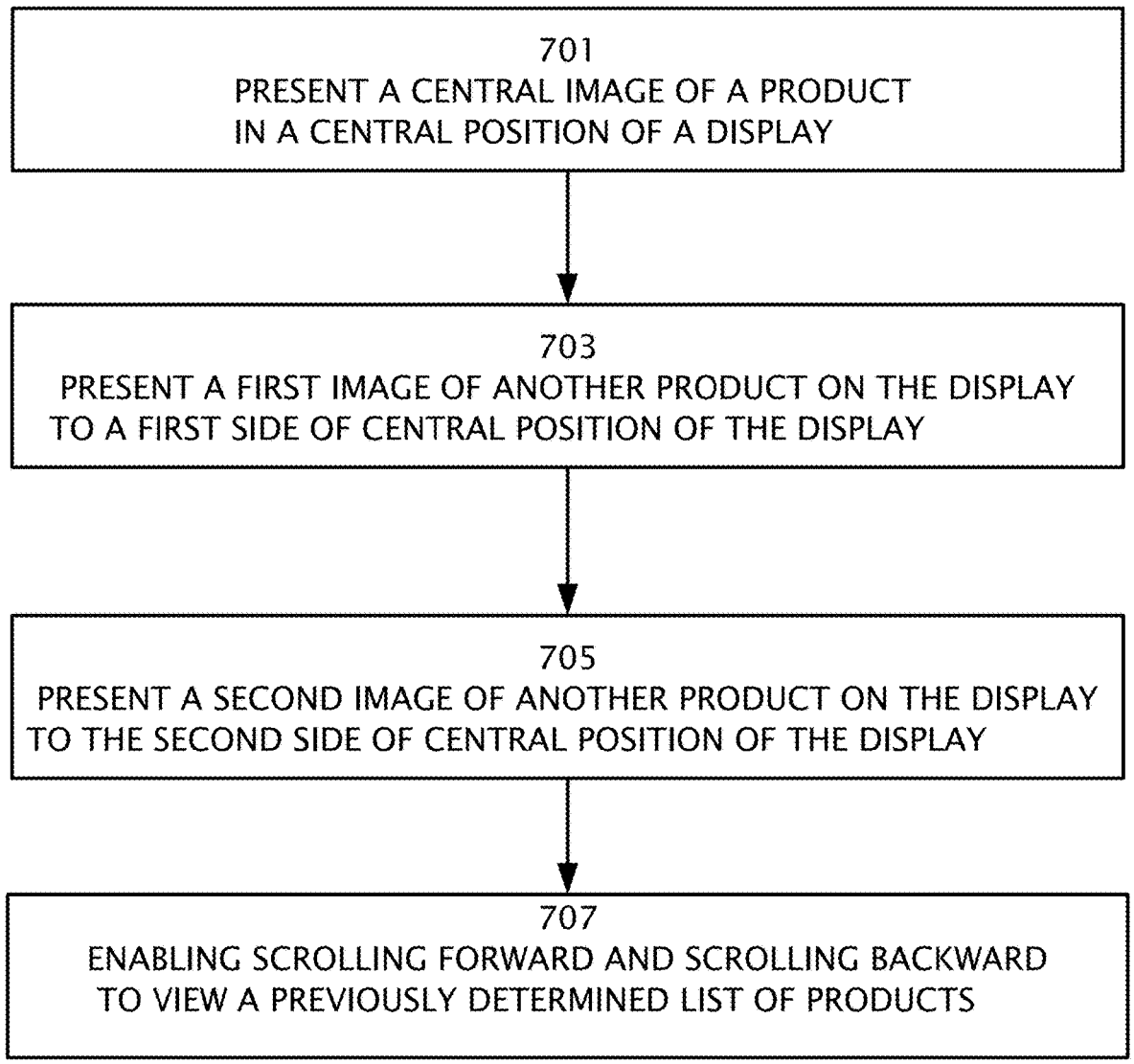
FIG. 7 illustrates a method for presenting a graphic user interface, according to features of the present invention.

Reference is now also made to FIG. 7, a flow chart illustrating a method 700 performable on a mobile computer system. The mobile computer system is provided with a client application. The client application accesses a data base of products. A central image of a product is presented 701 in a central position of a display of the mobile computer system. A first image of another product is presented 703 on the display to a first side of central position of the display. A second image of another product is presented 705 on the display on the second side of central position of the display, the second side opposite the first side with respect to the central position. Scrolling is enabled 707 forward and scrolling backward to view a previously determined list of products which is a subset of the database of products. Forward scrolling is performed by moving the first image to the central position of the display, moving the central image to the second side and another image of a previous product on the list is presented on the first side of the central position. The backward scrolling is performed by moving the central image to the first side, moving the second image to the central position of the display, and another image of a next product on the list is presented on the second side. The image presented in the central position at each instant in time, is an image scaled to be significantly larger, e.g. at least 7/6 times larger than the images presented on the first and second sides of the central position. The first image, the central image and the second image may be the only product images being presented at any instance of time. The scrolling forward and the scrolling backward may be performed by the user by swiping the display forward and backward respectively.

In still further embodiments, a virtual shopping cart may be automatically generated from a message received from a user via a messaging service. The message may be received by a management server via a communication network from a user's communication device. Accordingly, a user may send a simple message such as a plain text message, a voice message or the like and the client application and/or management server may analyze the incoming message to identify products itemized therein so that an appropriate set of selected products may be generated included in a virtual shopping cart.

Figure 8A:
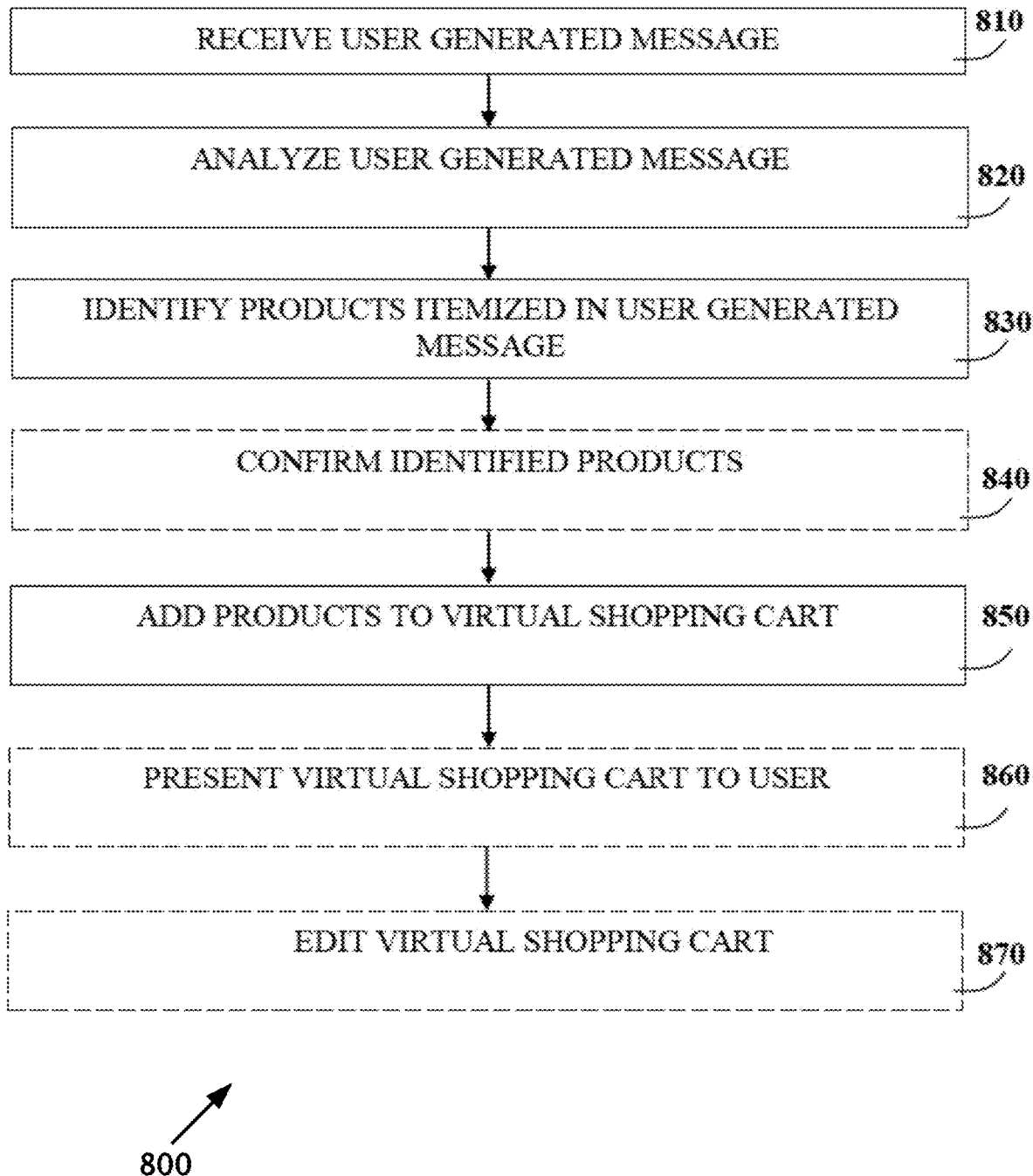
FIG. 8A is a flowchart illustrating a method for generating a virtual shopping cart from a message received from a user according to other features of the present invention.

Reference is now made to the flowchart of FIG. 8A, illustrating a method 800 for generating a virtual shopping cart from a message received from a user according to another embodiment of the shopping platform. Method 800 may include receiving 810 a user generated message, analyzing 820 the message, identifying products 830 itemized in the message, optionally confirming or replacing 840 any of the identified products, adding 850 the selected products to the virtual shopping cart, and where appropriate, presenting 860 the virtual shopping cart to the user and editing 870 the virtual shopping cart accordingly. Regarding step 810, receiving of the user generated message, it is noted that the message may be received via any suitable messaging service. For example, a message may be received in a plain text format of a short messaging service (SMS) via a cellular network. Additionally or alternatively, a message may be received via email or other internet based communication service. Where appropriate messages may be sent via a chat messaging service for example a web based chat engine or a software application executed on a communication device such as Whatsapp®, Facebook®, Google Hangouts® or the like. Still other messaging services may be used such as any email client, Twitter® and the like.

Although the incoming message may be a text message, in still other embodiments, the incoming message may be an audio file or the like. Where the incoming message is an audio file, it will be appreciated that step 820 of analyzing the message may include performing speech recognition analysis on the audio message and generate text from the spoken words in the message.

In still other examples, the incoming message may include a visual image such as a photograph, scan or the like. Accordingly, step 820 of analyzing the message may include performing image processing in order to identify an object within the frame of the image. For example, image analysis may identify a known product from an image file or from an analysis of recognized text within the image. Alternatively or additionally, the image may include a digital code format, such as a bar code, a QR code of the like which may be analyzed and a product identified accordingly. Camera 26 (FIG. 1) may be initiated, a window showing current camera image may open below region 31 (FIG. 3A) and the image to be analyzed is captured. Analysis 820 and identification 830 may follow. The identified product may be added to the carousel, and presented in region 31.

Upon analysis of the user generated message, the text of the message may be parsed and terms isolated which indicate particular products. These message terms may relate to a specific product or may alternatively relate to a set of candidate products. Furthermore, secondary data may be obtained from the user generated message such as location and time data which can be analyzed and identified. It is noted that such data maybe useful for the generation of a full cart or product price comparison for the target address, as discussed hereinabove.

The identification of the terms (products/commands) included in the user's message might include natural language processing techniques (NLP) and or statistical analysis of accumulated big data based on user's interactions with the system. By way of example, a user may itemize an unambiguous product specific term such as '500 grams of onion' in which case 500 grams of onion is added to the virtual shopping cart. Alternatively, the user may use an ambiguous product term such as 'cola' which may relate to a set of candidate cola products. Accordingly, one product may be selected from the set of candidate products to be added to the virtual shopping cart. Selection of the product from the set of candidate products may be automatic, for example a particular product may be defined as a default product for a particular term. The default product may be, for example, a product sponsored by particular manufacturer either generally or for a particular user type. Additionally or alternatively, the default product may be user specific for example generated according to user specific historical or accumulated usage habits.

Accordingly, a reference set of product terms may be personalized for the user, for example including product nicknames previously used and confirmed by the user. The personalized reference set of product terms for the user may be generated by collecting a database of product terms historically used by the user and matching or otherwise associating these terms with products purchased when the terms were used. Optionally the personalization mechanism may use machine learning to automatically generate a personalized preference profile based upon historic usage patterns. Accordingly, a grading or scoring mechanism may be provided to rank each product according to how well it matches a particular user. Where appropriate, the database of product terms may also receive input from other users further assisting with the recognition of commonly used terminology in general or within the user's social group in particular. Accordingly, terms isolated from the message may be compared with the reference set of product terms. It is another feature of the invention that a personalization mechanism may enable the automatic categorization of products as well as the ordering of product categories according to a user's preferences and personalization profile. Additionally and alternatively, the preference profile may be generated or edited manually. Similarly, a prioritization mechanism for sorting sorting products and product alternatives may be personalized. Accordingly, a user might be presented with default products in his cart perhaps based on advertised products when no explicit products was mentioned. The user may then be advised to change a default or a selected product to another according to various factors such as health, lifestyle, social recommendations, price, availability, advertised products, special offers and the like.

Regarding editing 870 of the virtual shopping cart, it will be appreciated that the user may be given permissions to add change or delete products from the automatically generated virtual shopping cart as required. Although the above description refers to one user generating a single virtual shopping cart, it is noted that where required, more than one user may be associated with a shared virtual shopping cart. So, for example, a husband and wife may both send messages to a common account and products may be added to their shared virtual shopping cart from either party. It is noted that although the shopping cart may be shared between the two users, the product terms used may be different for each party and each may have their own personalized product terms database. Conversely, a single user may be associated with multiple shopping carts. Where a virtual shopping cart is shared it is noted that different permissions may be assigned to each party regarding product or purchase confirmations.

Figure 8B:
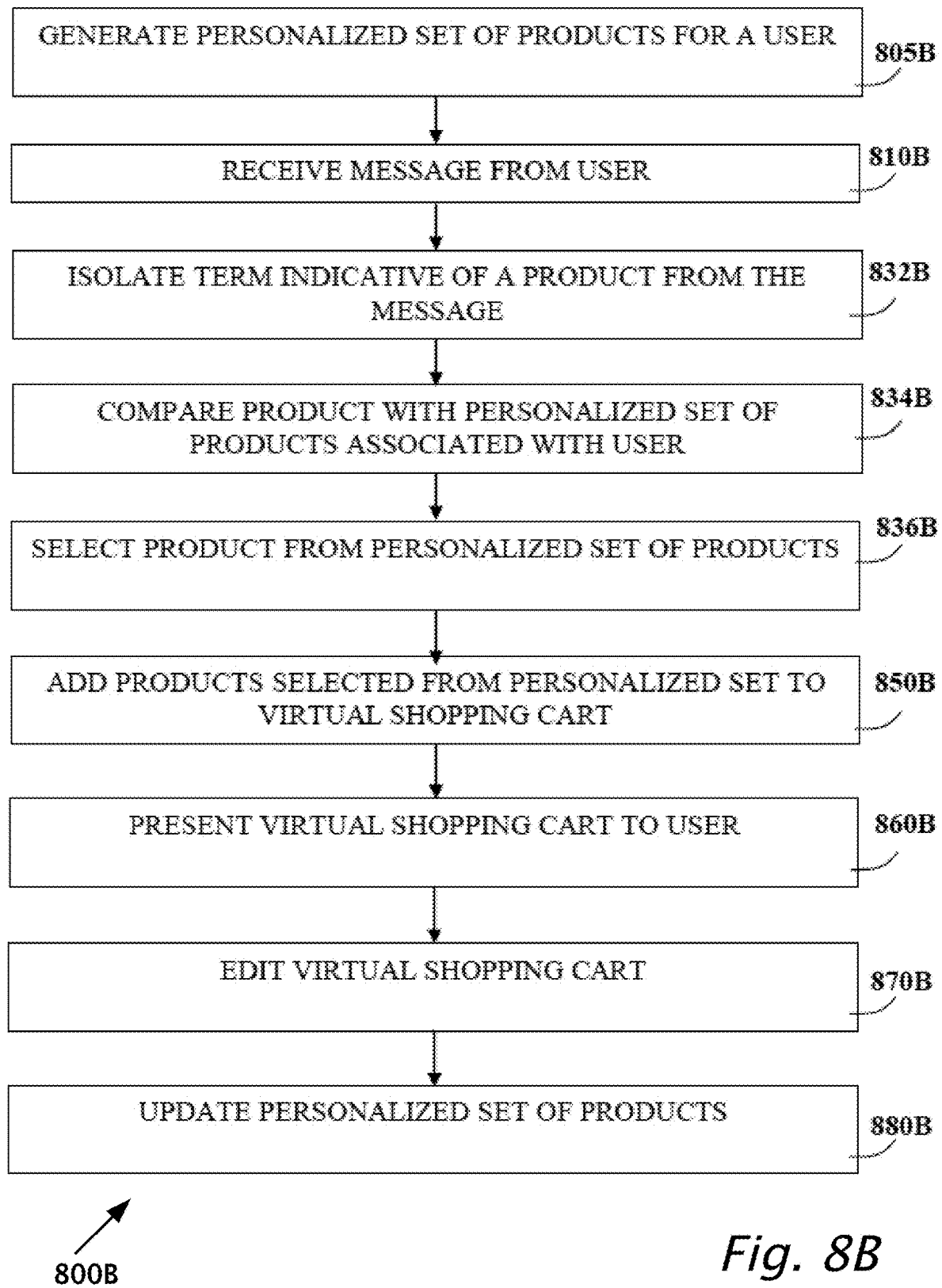
FIG. 8B is a flowchart illustrating another example of a method for generating a virtual shopping cart according other features of the present invention.

Reference is now made to the flowchart of FIG. 8B which represents for illustrative purposes only another example of a method 800B for generating a virtual shopping cart according to a user personalized set of products. Method 800B includes generating a personalized set of products for a user 805B, receiving a message from a user 810B, isolating terms indicative of a product from the message 832B, comparing the indicated product with the personalized set of products 834B, selecting a product from the personalized set of products 836B, adding the selected products to the virtual shopping cart 850B, presenting the virtual shopping cart to the user 860B, editing the virtual shopping cart 870B and updating the personalized set of products accordingly 880B.

Regarding step 805B, generating of the personalized set of products, this may include collecting a database of products previously purchased or interacted by the user. Once the user personalized database is populated, a specific product may be selected from the set of products associated with the user according to the product terms isolated from the message. Similarly, once the historical shopping habits of the user are established, a default quantity of products may be determined at least in part by analyzing data or the entire cart might get predicted relating to historic purchasing/products interactions behavior of the user, market trends and predictions based on other users behavior. The determined default quantity of products may be added to the virtual cart when the user requires this product.

Figure 8C:
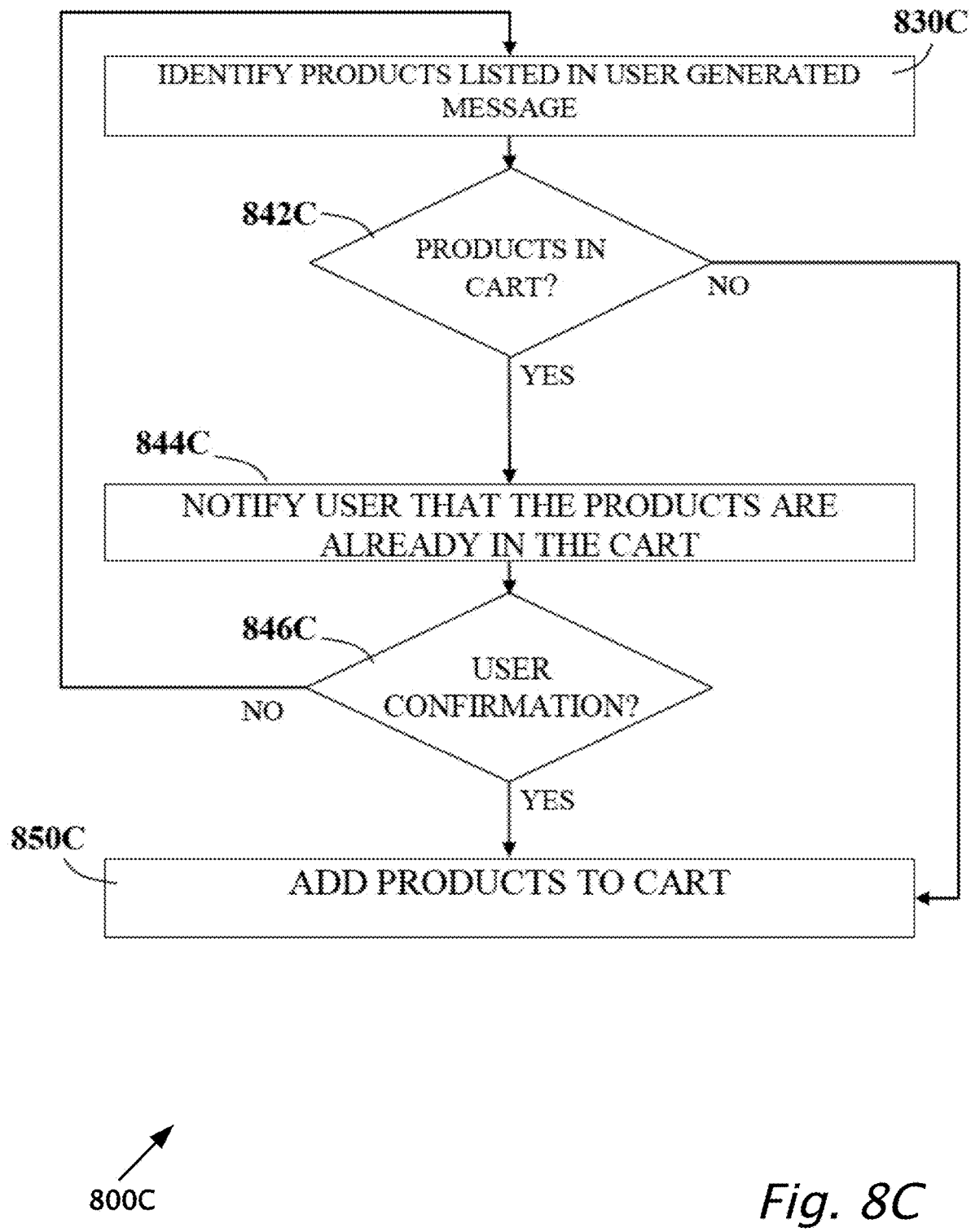
FIG. 8C is a flowchart illustrating a first example of a method for confirming products identified from a message received from a user as they are being added to a virtual shopping cart, according to features of the present invention.

Referring now to the flowchart of FIG. 8C a first example of a method 800C is presented for confirming products identified from a message received from a user before they are added to a virtual shopping cart. The method may prevent the same item being added more than once to the cart. It will be appreciated that this method may be of particular importance where a user sends multiple messages over a period of time and may forget between each message which items have already been ordered. Similarly, method 800C may be useful where multiple users are adding items to a common shopping cart. Method 800C may include identifying products listed in a user generated message 830C, checking if the products are already included in the cart 842C and if they are not then adding them immediately or suggesting adding them to the cart 846C. If the products are already in the cart then the user is notified automatically that the products have already been ordered 844C and requesting confirmation 846C. Then if the user confirms the request, the products are added to the cart 846C.

Figure 8D:
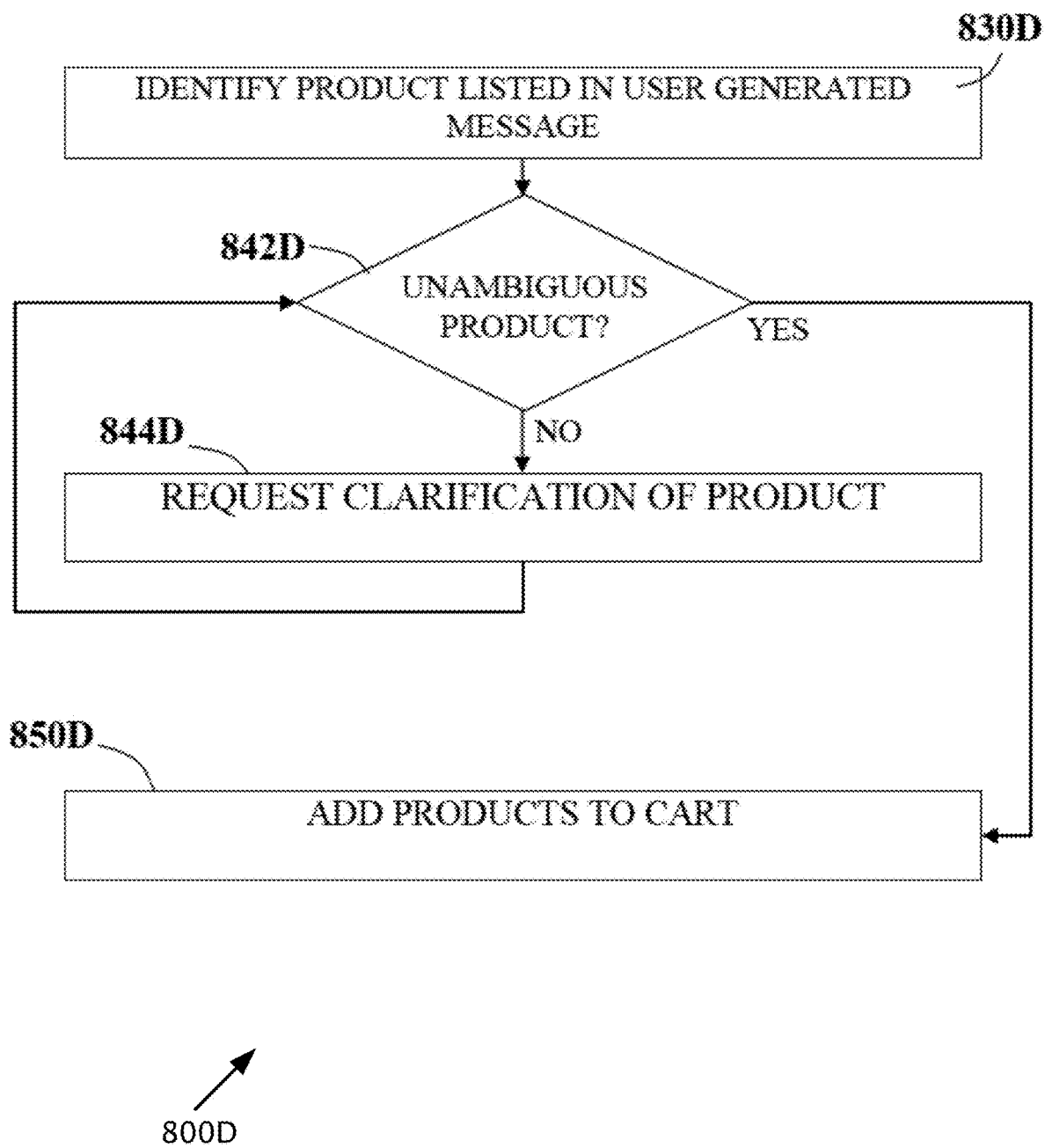
FIG. 8D is a flowchart illustrating a second example of a method for confirming products identified from a message received from a user before they are added to a virtual shopping cart.

Referring to the flowchart of FIG. 8D, a second example of a method 800D is represented for confirming products identified from a message received from a user before they are added to a virtual shopping cart. In this case, when a product is identified in the user generated message 830D, the system establishes if the product is an unambiguous product 842D.

If the product is unambiguous, either because of the term used or because of unambiguous historical purchase behavior of the user, then the unambiguous product is immediately added to the cart 850D. Thus, for example, if a user always buys the same brand of cola then this brand is always to be added to the cart when the term cola is identified.

However, where the product is deemed ambiguous, say where the user sometimes buys one brand and sometimes another, the system may send an automatic request for clarification from the user 844D; for example, where the identified term is 'cola' but the user sometimes buys diet cola and sometimes regular cola. The system may prompt the user accordingly, for example by asking 'regular or diet', by showing a picture of the products or by using user specific prompts such as 'do you mean the one you bought last week?' or the like.

When the user answers unambiguously, the system may add the product to the cart according to the clarification. It will be appreciated that the such automatic requests may be generated by an interactive communication engine operable to communicate with the user to clarify, recommend, advise or otherwise assist the user during the purchasing procedure. Such a shopping robot, or the like, may communicate with the user in an interactive manner typically using native language via any communication media, such as text based, visual based, voice based or sense based media, although not limited thereby. Accordingly, the interactive communication engine may be accessible to a user via a chat application such as Whatsapp® or the like by adding the engine to the contacts and communicating with the shopping robot as with another real person. Thus in some embodiments, a user may speak, enter text or otherwise enter a phrase into a communication device, such as a smartphone or the like using native language and this text may be used by the interactive communication engine or shopping robot to generate an informative response useful to the user.

For the purposes of illustration only, a user may use the interactive communication engine to provide commands using native language, for example a user may input the phrase "Start a new cart" to initiate a new purchase or "Add new product" to add a product to an existing virtual shopping cart. Similarly, the phrase, "Show me my cart", "What should I buy next", "Clear cart", "Share cart", "Purchase cart", "Delete cart" and the like may be used to provide functional commands to execute various operations accordingly.

Other input phrases may trigger the interactive communication engine to generate advisory messages based upon the user's personal preference profile. For example, the phrase "Show me my typical weekend cart?" or "What should I buy today?" may generate a full shopping cart based upon history of the users shopping behavior and what the system predicts the user would be most likely to purchase on this particular day. Similarly, direct questions such as "What is my most purchased product?" or "How often do I purchase Milk?" may provide the user with the required answers.

Other phrases such as "Which one of these product is better for me?", or "Which one of these is better for my kid?" may illicit advisory messages based upon product specific data, users preferences, lifestyle choices or the like. Still other phrases may generate store specific data pertaining to desired products such as "What is the best type of pasta for me which is available today?", "What is the most popular product in the market today?". Accordingly, the interactive communication engine can combine data from various sources to generate suitable native language answers as required.

In a response to a user's response to a message from the interactive communication engine's message, the system may refer the user to a dedicated application or may send a link (URL) directing the user to a requested cart as appropriate to the message context.

By way of example only, a link may be sent to a user by a shopping robot, the link may connect the user to a shopping cart for example where default products have been added and which may be edited as required. It is a feature of the interactive communication engine that it may be an artificially intelligent application utilizing ongoing machine learning. Accordingly, self learning may enable the engine to accumulate data based on all users' interactions with products such that the system generates suitable advisory messages as required.

Furthermore, where appropriate, the user might receive unsolicited advisory messages from the communication engine, such as product recommendations and the like. Such advisory messages may be generated according to personalized or advertised products, personalized coupons, reminders for completing, ordering or purchasing a pending shopping cart.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, transitory and/or non-transitory which is accessible by a general-purpose or special-purpose computer system. By way of example, and not limitation, such computer-readable media can comprise physical storage media such as RANI, ROM, EPROM, flash disk, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a smartphone, Personal Digital Assistant "PDA" and/or tablet) where internal modules (such as a memory and processor) work together to perform operations on electronic data. While any computer system may be mobile, the term "mobile computer system" especially includes laptop computers, net-book computers, tablets, cellular telephones, smart-phones, wireless telephones, personal digital assistants, portable computers with touch sensitive screens and the like.

In this description and in the following claims, a "network" is defined as any architecture where two or more computer systems may exchange data. The term "network" may include wide area network, Internet local area network, Intranet, wireless networks such as "Wi-fi", virtual private networks, mobile access network using access point name (APN) and Internet. Exchanged data may be in the form of electrical signals that are meaningful to the two or more computer systems. When data is transferred or provided over a network or another communications connection (either hard wired, wireless, or a combination of hard wired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

The term "server" as used herein, refers to a computer system including a processor, data storage and a network adapter generally configured to provide a service over the computer network. A computer system which receives a service provided by the server may be known as a "client" computer system.

The term "side" as used herein refers to left, right, upper, lower and the term "opposite side" refers to left/right as opposites and upper/lower opposites.

The term "significantly larger" as used herein refers to "at least one sixth larger" in the context of the relative scale of images being displayed in the central position relative to the scale of the same image presented in one of the side positions.

The term "corresponding image" as used herein refers to an image of the same product.

The articles "a", "an" is used herein, such as "a processor", "a server", a "product" have the meaning of "one or more" that is "one or more processors", "one or more servers" and "one or more products".

The present application is gender neutral and personal pronouns 'he' and 'she' are used herein interchangeably.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features. Instead, it is to be appreciated that changes may be made to these features, the scope of which is defined by the claims and the equivalents thereof.

The invention claimed is:

1. A method for electronic commerce, the method performable on a mobile computer system, the method comprising:
providing the mobile computer system with a client electronic commerce application, wherein the client electronic commerce application accesses a data base of products;
providing a previously determined scrollable list of products from the data base of products in a flat line arrangement for display on a graphic user interface of the client electronic commerce application;

presenting a central image of a product, from the previously determined scrollable list of products in a central position of a display of the mobile computer system;

presenting a first image of another product, from the previously determined scrollable list of products on the display to a first side of the central position of the display;

presenting a second image of another product, from the previously determined scrollable list of products on the display on the second side of the central position of the display, the second side opposite the first side with respect to the central position;

enabling forward and backward scrolling to access the previously determined scrollable list of products;

wherein the forward scrolling is performed by moving the first image to the central position of the display, moving the central image to the second side and another image of a previous product on the list is presented on the first side of the central position;

wherein the backward scrolling is performed by moving the central image to the first side, moving the second image to the central position of the display, and another image of a next product on the list is presented on the second side; and acquiring information with respect to the user and with respect to the product being presented in the central position, wherein said information includes total time a product is presented in the central position of the display, or said information includes a number of times a product is presented in the central position.

2. The method of claim 1, wherein the only product images presented at any instance of time are the first image, the central image and the second image.

3. The method of claim 1, wherein the scrolling forward and the scrolling backward are performed by the user by swiping the display forward and backward respectively.

4. The method of claim 1, further comprising:
presenting, on the display, attributes associated with a product being presented in the central position of the display.

5. The method of claim 4, further comprising:
registering a user with the server application;
inputting by the user a profile including a plurality of user criteria selected by the user to characterize properties of products according to the user's purchasing preferences;
inputting by the user an identifier of a third party registered with the server application, the third party having previously input third party criteria which characterize properties of products according to the third party's purchasing preferences; and
said presenting said attributes on the display responsive to both the user criteria and the third-party criteria.

6. The method of claim 4, further comprising:
said presenting said attributes on the display upon said forward or said backward scrolling without any additional action on the part of a user.

7. The method of claim 1, further comprising:
presenting an add-to-shopping-cart icon on the display to increment the quantity in the shopping cart of the product being currently presented in the central position.

8. The method of claim 7, further comprising:
upon a user of the mobile computer system selecting the add-to-shopping-cart icon incrementing a number representing quantity in the shopping cart of the product being currently presented in the central position;
superimposing the number over the image of the product being currently presented in the central position; and
during the forward and the backward scrolling maintaining the superimposition of the number over the image of the product.

9. A non-transitory computer-readable-medium having software instructions stored therein to perform a method comprising the steps of:
providing the mobile computer system with a client electronic commerce application, wherein the client electronic commerce application accesses a data base of products;
providing a previously determined scrollable list of products from the data base of products in a flat line arrangement for display on a graphic user interface of the client electronic commerce application;
presenting a central image of a product, from the previously determined scrollable list of products in a central position of a display of the mobile computer system;
presenting a first image of another product, from the previously determined scrollable list of products on the display to a first side of the central position of the display;
presenting a second image of another product, from the previously determined scrollable list of products on the display on the second side of the central position of the display, the second side opposite the first side with respect to the central position;
enabling forward and backward scrolling to access the previously determined scrollable list of products;
wherein the forward scrolling is performed by moving the first image to the central position of the display, moving the central image to the second side and another image of a previous product on the list is presented on the first side of the central position;
wherein the backward scrolling is performed by moving the central image to the first side, moving the second image to the central position of the display, and another image of a next product on the list is presented on the second side; and
acquiring information with respect to the user and with respect to the product being presented in the central position, wherein said information includes total time a product is presented in the central position of the display, or said information includes a number of times a product is presented in the central position.

10. The non-transitory computer-readable-medium of claim 9, wherein the only product images presented at any instance of time are the first image, the central image and the second image.

11. The non-transitory computer-readable-medium of claim 9, wherein attributes associated with a product are presented in the central position of the display.

12. The non-transitory computer-readable-medium of claim 9, further having software instructions stored therein to:
present an add-to-shopping-cart icon which when selected is configured to:
(i) add the product being currently presented in the central position to a shopping cart,
(ii) increment a number representing quantity in the shopping cart of the product being currently presented in the central position, (iii) superimpose the number over the image of the product being currently presented in the central position; and (iv) during forward and backward scrolling, maintain the superimposition of the number over the image of the product.

13. A graphical user interface operating on a mobile computer system for electronic commerce, wherein the mobile computer system is provided with a client electronic commerce application, wherein the client electronic commerce application is configured to access a data base of products, wherein a previously determined scrollable list of products from the data base of products is provided in a flat line arrangement for display on the graphic user interface of the client electronic commerce application, the graphical user interface comprising:

a central image of a product, from the previously determined scrollable list of products, in a central position of a display of the mobile computer system, the second side opposite the first side with respect to the central position;

a first image of another product, from the previously determined scrollable list of products, on the display to a first side of central position of the display;

a second image of another product, from the previously determined scrollable list of products, on the display on the second side of central position of the display;

wherein forward and backward scrolling is enabled to access the previously determined scrollable list of products; and wherein the forward scrolling is performed by moving the first image to the central position of the display, moving the central image to the second side and another image of a previous product on the list is presented on the first side of the central position;

wherein the backward scrolling is performed by moving the central image to the first side, moving the second image to the central position of the display, and another image of a next product on the list is presented on the second side;

wherein a product image when presented in the central position is scaled to be significantly larger than a corresponding product image when presented on the first and second sides of the central position;

wherein information is acquired with respect to the user and with respect to the product being presented in the central position, wherein said information includes total time a product is presented in the central position of the display, or said information includes a number of times a product is presented in the central position.

* * * * *